United States Patent
Eissner et al.

(10) Patent No.: US 7,719,263 B2
(45) Date of Patent: May 18, 2010

(54) INDUCTIVE POSITION MEASURING DEVICE OR GONIOMETER

(75) Inventors: Markus Eissner, Eschenbach (DE); Michael Schreiber, Greding (DE); Josef Habenschaden, Kohlberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/986,151

(22) Filed: Nov. 20, 2007

(65) Prior Publication Data
US 2008/0157756 A1    Jul. 3, 2008

(30) Foreign Application Priority Data
Nov. 22, 2006 (EP) .................................. 06024226
Jul. 17, 2007 (EP) .................................. 07112634

(51) Int. Cl.
G01B 7/00 (2006.01)
G01R 33/00 (2006.01)

(52) U.S. Cl. .................................. 324/207.15; 324/236

(58) Field of Classification Search ............ 324/207.13, 324/207.15, 207.24–207.25, 234, 236, 257–258; 377/17, 19; 331/44, 46
See application file for complete search history.

(56) References Cited

U.S. PATENT DOCUMENTS

| | | | |
|---|---|---|---|
| 3,781,749 A | 12/1973 | Iles et al. | |
| 3,875,555 A * | 4/1975 | Potter | .......................... 340/939 |
| 4,580,478 A | 4/1986 | Brosh et al. | |
| 4,642,595 A | 2/1987 | Ruumpol | |
| 4,658,153 A | 4/1987 | Brosh et al. | |
| 5,003,260 A | 3/1991 | Auchterlonie | |
| 5,079,523 A | 1/1992 | Kleinhans | |
| 5,233,294 A | 8/1993 | Dreoni | |

(Continued)

FOREIGN PATENT DOCUMENTS

DE    3619238    3/1987

(Continued)

OTHER PUBLICATIONS

Apr. 30, 1999 Radiation-proof proximity sensor, B.V. Jayawant et al., Measurement + Control 32 80-83.

*Primary Examiner*—Bot LeDynh
(74) *Attorney, Agent, or Firm*—Jordan and Hamburg LLP

(57) ABSTRACT

The invention relates to an inductive position measuring device or goniometer having two to no more than five digital oscillators, each of which contains measuring coils or reference coils. Particularly favorable for one application as a transmission sensor is a coil array for three or four oscillators that includes two measuring coils and/or two reference coils. When one plate-shaped measuring element that is sensitive for eddy currents passes through the measuring area, a measuring coil arranged in a planar manner is increasingly covered. One reference coil is arranged such that it does not touch the movement track of the measuring element, but is exposed to the same ambient conditions (temperatures) as the measuring coil. Another reference coil is arranged such that it is covered by the measuring element in the entire measuring area and therefore can compensate the fluctuations in the spacing height between the planar coil array and the measuring element that occur during operation. It is also possible to use additional height reference coils to compensate tilting of the measuring element. Pulse frequencies of the digital oscillator signals are counted asynchronously and subtracted by pairs in a digital evaluation circuit.

33 Claims, 15 Drawing Sheets

U.S. PATENT DOCUMENTS

| | | | |
|---|---|---|---|
| 5,264,809 A | 11/1993 | Tamino | |
| 5,425,073 A * | 6/1995 | Bitzer et al. | 377/17 |
| 5,617,023 A | 4/1997 | Skalski | |
| 6,043,644 A | 3/2000 | de Coulon et al. | |
| 6,175,232 B1 | 1/2001 | De Coulon et al. | |
| 6,179,938 B1 | 1/2001 | Mannhart et al. | |
| 6,822,440 B2 | 11/2004 | Machul | |
| 6,852,937 B2 | 2/2005 | Zapf et al. | |
| 6,853,183 B2 | 2/2005 | Kindler | |
| 2005/0258687 A1 | 11/2005 | Zapf et al. | |
| 2008/0142346 A1 | 6/2008 | Zapf et al. | |

FOREIGN PATENT DOCUMENTS

| | | |
|---|---|---|
| DE | 3735694 | 5/1988 |
| DE | 3743259 | 6/1989 |
| DE | 40 38 515 | 6/1992 |
| DE | 42 37 879 | 5/1994 |
| DE | 19806529 | 8/1999 |
| EP | 0 455 613 | 11/1991 |
| EP | 0 537 747 | 4/1993 |
| EP | 0 936 385 | 8/1999 |
| FR | 28 03030 | 6/2001 |
| GB | 1415644 | 11/1975 |
| GB | 2 272 295 | 5/1994 |
| WO | WO 2004/027994 | 4/2004 |
| WO | WO 2005/027347 | 3/2005 |

* cited by examiner

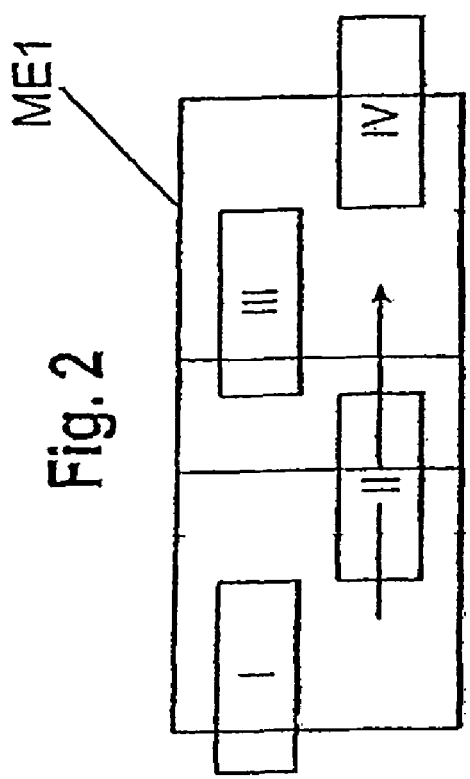

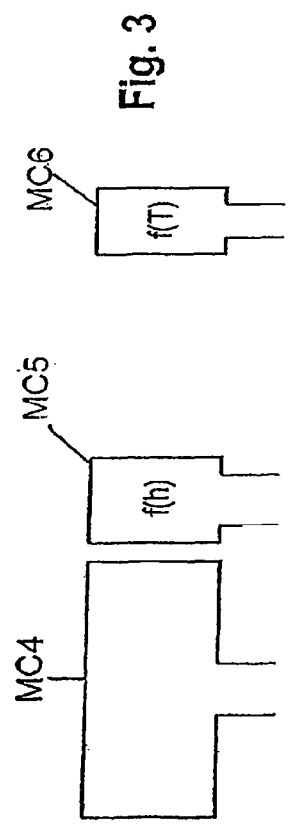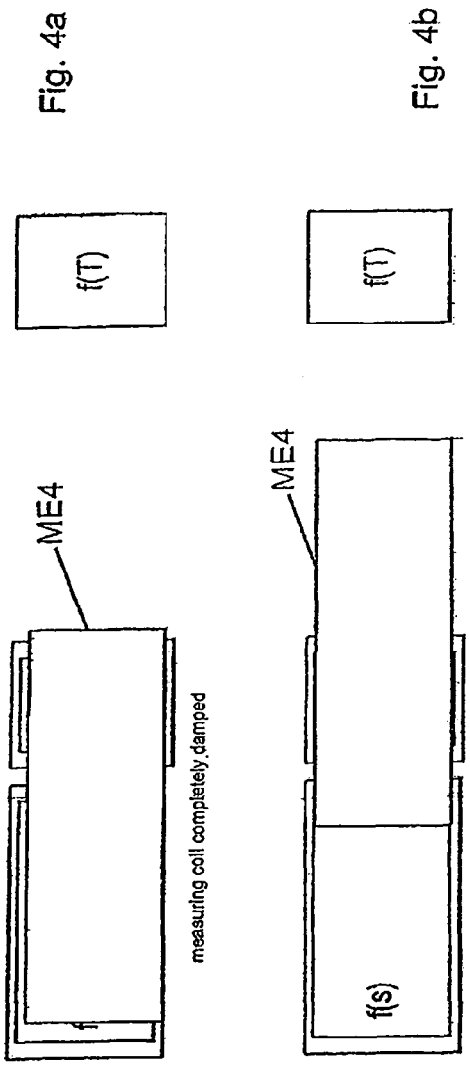

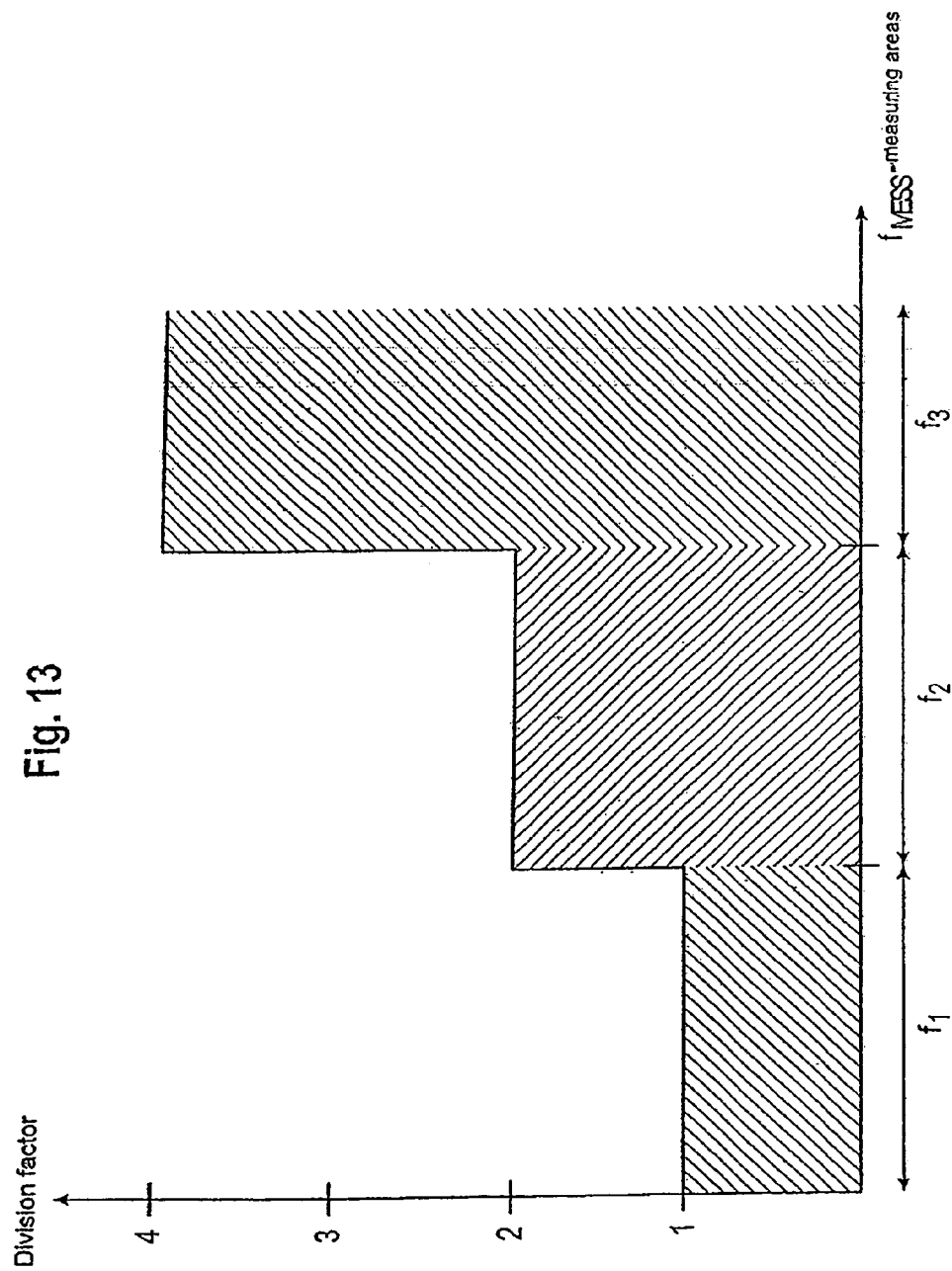

INDUCTIVE POSITION MEASURING DEVICE OR GONIOMETER

This application claims foreign priority under 35 U.S.C. 119 (a-d) of EPO Patent Applications No. 06 024 226.0, filed Nov. 22, 2006, and No. 07 112 634.2, filed Jul. 17, 2007, the contents of which are incorporated herein by reference in their entirety.

The invention relates to an inductive position measuring device or goniometer having two, three, or four digital oscillators, each of which contains a measuring coil or a reference coil. The measuring or reference coils form a coil array, and a movable measuring element assumes a certain position or angular position in the vicinity thereof. The measuring element can belong for instance to a transmission sensor that is installed in a motor vehicle transmission. In this application, the measuring element is mechanically linked to a gear selection actuator within the transmission. In particular the gear selection actuator can be a selector swing fork of a dual clutch transmission. The measuring element can be adapted to a linear movement of an actuator or to the curved movement e.g. of the selector swing fork. In the latter case, the measuring element that is guided via a coil array, which is then curved, can itself be curved corresponding to the direction of movement. The inductive position measuring device makes it possible to obtain feedback about what gear has just been engaged in an automatic transmission. Moreover, it detects in real time and with positional accuracy the sequence of the shifting process internal to the transmission, for instance the movement of the aforesaid selector swing fork between the positions "Engage in a synchronizing ring A", "Center", and "Engage in a synchronizing ring B" in the dual clutch transmission.

The inductive measuring device preferably works according to the principle of an eddy current sensor. Within the framework of the invention it is also possible to attain changes in inductivity in the measuring device using measuring elements made of soft-magnetic materials such as e.g. ferrite. However, in the following, a weakening of the magnetic field will be considered as an example, rather than a strengthening of the magnetic field. In an electrically conductive measuring element, the magnetic field of the measuring coil generates eddy currents that act on the coil. Inter alia, the inductivity of the measuring coil is influenced by the spatial position of the measuring element relative to the coil. This changeable inductivity, together with a capacity of a capacitor, determines the natural frequency of a corresponding oscillator that can be embodied for instance as a Colpitts oscillator. The evaluation of the natural frequency permits position measurement (i) with good locational resolution within a measuring range of for instance 24 mm and (ii) with good time resolution of for instance 1 ms.

BACKGROUND

Document DE 42 37 879 A1 (document '879) discloses an evaluation circuit for a similarly embodied inductive sensor. Two measuring coils are switched as differential sensors, i.e., inductivities of the two coils change in opposition to one another as a function of a detected position of a core. Each measuring coil is operated together with two capacitors as a sensor oscillator that with an inverting amplifier create a digital Colpitts oscillator. The output signal of this oscillator can be immediately further processed in a digital evaluation circuit. The oscillation duration of the oscillator is determined in that an oscillator signal releases a counter and after, for instance, two oscillation periods, the counter is stopped. The counter reading of the counter increases synchronously with a cycle frequency that is supplied by a separate oscillator and that is substantially higher than the frequency of the sensor oscillator. Then, the counter readings for the two opposing sensor oscillators are subtracted and output as digital measurement results.

Known from document DE 40 38 515 A1 (document '515) is another device for measuring longitudinal or angular position. It is used for instance in motor vehicles to monitor a vehicle body level or to measure an angular position of a crankshaft. Problems associated with the measuring device are a large temperature range and other negative effects caused by ambient conditions. A sampling coil is part of an LC resonant circuit, which is itself operated by a controlled sampling oscillator. As an analog circuit, oscillator circuit and resonant circuit produce an alternating voltage, the frequency of which is determined by the resonant circuit but is not substantially changed during the measurement. On the contrary, a plurality of sampling oscillators are used adjacent to one another, and the amplitudes of their resonant circuits are influenced by damping and non-damping of a plurality of parallel code tracks. The resonant circuit is tuned to somewhat different resonance frequencies in order to eliminate interfering cross-talk between the sampling coils. For damping each sampling coil, a binary track is used that has been calibrated in the longitudinal unit and that comprises surfaces that are alternately conducting and non-conducting metals. In order to obtain reliable measurement results over a wide temperature range, an additional reference oscillator is provided that is arranged in a manner largely identical to that of the sampling oscillators in terms of structure and space such that it is subjected to the same ambient conditions as the sampling oscillators. The reference oscillator always remains undamped; in addition it is controlled analogously in a mode with a constant amplitude. Its controlled variable, which reflects environmental factors, is used for controlling the amplitude of the actual sampling oscillators and thus as a comparison value for voltages for the sampling oscillators.

SUMMARY

When using inductive measuring devices of this or a similar type in transmissions, there are five problems that occur more often and that mutually promote one another and extend beyond the known temperature dependency. For one thing, inside the transmission, the space for a printed circuit board on which the oscillators and the evaluation circuit are usefully built is fundamentally narrower and also limited due to the inductive measurement principle. Secondly, the coils that are added to the printed circuit board in a planar manner and the other components of the oscillator circuit and evaluation circuit are subject not only to normal temperature drift, but must also cooperate reliably with the movable measuring element in a temperature range that assumes operating temperatures in the transmission that are between −40° C. and +15° C. Thirdly, in addition to the heat expansion caused by this, mechanical tolerances in the transmission influence the functionally-important spacing height between the planar measuring coil on the one hand and the disk-shaped measuring element that is to be kept at the most constant possible spacing over the measuring coil. Fourthly, since the inductive sensor unit is also to resolve a plurality of transition positions along a movement path of the gear selection actuator or a plurality of angular positions, it is necessary to have a linear characterizing line for the sensor in a relatively large measuring area. Finally and fifthly, a metal sludge that accumulates in an oilpan of a transmission due to friction should not affect the measurement (as is the case for instance with a Hall sensor, the permanent magnet of which is deposited with iron fines as operation duration increases.)

The object of the invention is therefore to provide a space-saving position measuring device or goniometer that can be used in a wide temperature range and that is not sensitive to mechanical tolerances or to wear on the part of a measured object and that has a greatest possible position measuring or angle measuring range of which a characterizing line is linear.

As in the prior art in accordance with documents '879 and '515, LC resonant circuits are used for oscillators. Different from document '879, the oscillators of the present invention do not share same capacitors in time multiplex, but rather work in parallel, each for itself and without switching oscillator coils. Different from document '515, a single measuring oscillator is adequate for absolute position measurement, or alternatively two measuring oscillators in a differential circuit; this has the advantage that a measuring element can be used that is itself non-structured, relatively extended and robust, and provided with only a useful outer contour, instead of sampling by means of a series of oscillators a plurality of parallel, binary code tracks that are calibrated to small parts.

The oscillators in the present invention work digitally in the sense that they supply a pulse-like, amplitude-limited output signal having a position-dependent pulse frequency. This has the advantage that the output signal can be further processed immediately and digitally without an analog/digital converter or demodulators. Different from document '515, no analog oscillation amplitude is used as a measure for damping the coil. Different from document '879, the pulse frequencies of an oscillator range from 25 to 60 MHz and are thus high enough that they can be counted directly in the evaluation circuit (i.e., without an additional cycle oscillator).

In addition to an oscillator having a measuring coil, in accordance with an embodiment of the invention another oscillator can also contain a reference coil, a reference oscillator resulting. Different from the measuring coils and the measuring oscillator in document '879, the pulse frequency of such a reference oscillator is not a function of how much of the coil is covered by the movable measuring element, but rather, separate from the position measurement, detects disturbing factors that also act on the measuring coil. Depending on the disturbance variable to be compensated, the reference coil in the same measuring area of the movable measuring element remains either completely covered/damped (high frequency oscillator) or completely uncovered/undamped (low frequency oscillator).

Thus for instance the temperature dependency of the "pulse frequency as a function of measurement path" characterizing line can be compensated using a simple computing operation. Subtracting the pulse frequency of the measuring oscillator and the reference pulse frequency of the low frequency oscillator leads to good results. In contrast to document '515, no control circuit is required for keeping the reference oscillator constant and the controlled variable obtained in the reference oscillator does not have to be fed into the measuring oscillator.

A second type of reference oscillator that is not provided in either document '879 or '515 compensates mechanical tolerances that sensitively influence the spacing height between the coil array and the disk-shaped measuring element. Preferably all coils, in any case those coils covered by the measuring element, are planar, i.e. etched into the printed circuit board as flat coils. Static tolerances that derive from installing the measuring device in the transmission lead to spacing heights that can deviate between 0.5 mm and 3 mm from transmission to transmission. In addition, there are tolerances for the spacing height that can occur while the measuring device is operating. They are based on heat expansions in the transmission and add an additional +/−0.5 mm. Dynamic disturbances in the form of vibrations can also change the spacing between the measuring element and the coil array. These disturbing factors are removed by a reference coil that is completely covered by the movable measuring element at each location of the measuring area. The maximum damping effected by this through the eddy currents leads to minimum inductivity of the reference coil and to a maximum pulse frequency for the associated reference oscillator. In this case, simply subtracting the reference pulse frequency from the pulse frequency of the measuring oscillator would also compensate the disturbing factors. However, even more favorable is the possibility of subtracting the pulse frequencies of the two reference coils from one another. This difference provides a potential maximum value under the prevailing measuring conditions that can be used for a standardization value for adapting a suitable measuring period. Both the pulse frequency of the measuring oscillator and the pulse frequencies of the two reference oscillators are counted during an adaptively determined measuring period. The measuring and reference coil array suitable for this for three oscillators is particularly preferred.

The digital signals of all oscillators are fed to an integrated evaluation circuit that is embodied as a gate array (GA) or that can be programmed by the user (FPGA) or that can be switched in a fixed manner so that it is application-specific (ASIC). Each of the supplied pulse frequencies is counted in an input stage in an asynchronous frequency counter. Start and stop signals for the counters are generated by a control unit. The measuring period, that is, the difference between the start signal and the stop signal of the asynchronous counters, is provided to the control unit using the aforesaid reference measurements.

If necessary, the counter readings for the asynchronous counters are stored temporarily in registers and then tallied, in particular, subtracted in pairs. A subtraction unit is provided in the evaluation circuit for each frequency pair for which the signal difference is of interest in the specific embodiment of the invention.

The synchronous part of the evaluation circuit is cycled internally using a system frequency. Different from document '879, no special clock generator is provided, but rather the system frequency is derived from the pulse frequency of the oscillator with the reference coil that is not covered. By using an oscillator frequency as the system clock, temperature compensation is no longer needed for those temperature drifts that occur similarly within the oscillators. Furthermore, a separate clock generator as a component for the evaluation circuit is saved, so that the required chip surface is reduced when using an ASIC chip.

The object of the invention is attained in a particularly favorable manner by an inductive position measuring device and goniometer equipped with exactly three oscillators. The first oscillator contains, as measuring oscillator, the aforesaid measuring coil that is partially covered, corresponding to the measurement path, by the movable measuring element. The second oscillator contains, as low frequency oscillator, the reference coil that is not covered, while the third oscillator, as high frequency oscillator, uses the completely covered reference coil. Compared to a two-coil array, this three-coil array has the advantage that it can detect all reference values that are required for compensating a position measuring value, even under unfavorable operating conditions. At the same time, compared to a four-coil array, the three-coil array has the advantage that it does not require as much space on a measuring panel. The advantage that can be attained with a fourth coil (second measuring coil), linearization of the characterizing line, can also be attained using a simpler measure, specifically using a trapezoidal expansion in an end area of a basic rectangular shape of the planar measuring coil. The coils in the covering area of the measuring element are planar coils; the somewhat offset reference coil that is not covered can also be constructed as a discrete three-dimensional element as in an SMD (surface mount device) structure.

One preferred structure of a digital oscillator includes, in addition to the measuring or reference coil, two capacitors in a Colpitts circuit, a fed-back inverter with a load resistance converting the analog LC resonance into a digital pulse series. Further processing occurs by counting and subtracting the pulse frequencies, the system frequency of this digital evaluation circuit being derived from the pulse frequency of the low frequency oscillator.

The advantage of the dual use of an oscillator signal for a measuring signal and for the system frequency of the evaluation circuit can also be used in a measuring device that makes do with two measuring oscillators in a relatively undisturbed environment. The operation of the evaluation circuit in this case is cycled with a system frequency that derives from the pulse frequency of one of the measuring oscillators. The sequence in the evaluation circuit is not disturbed when the measured frequency, and thus also the controlling system frequency, is subjected to the changes in the framework of the measuring area.

The two measuring coils exchange their partial coverage during the measuring process. The difference in their measuring signals doubles the steepness of the characterizing line, which can be used in a known manner for the resolution or for the measuring area or for the measurement dynamics.

BRIEF DESCRIPTION OF THE DRAWINGS

Exemplary embodiments of the invention are explained using FIGS. 1 through 17c wherein:

FIG. 1 depicts a two-coil array having a measuring element as part of the position measuring device;

FIG. 2 depicts a four-coil array having a measuring element as part of the position measuring device;

FIG. 3 depicts a three-coil array as part of the position measuring device;

FIGS. 4a and 4b depict the three-coil array in accordance with FIG. 3, damped in two different positions by the movable measuring element;

FIG. 13 is a diagram for determining a division factor that is required in the second embodiment;

DETAILED DESCRIPTION

Figure 1A:
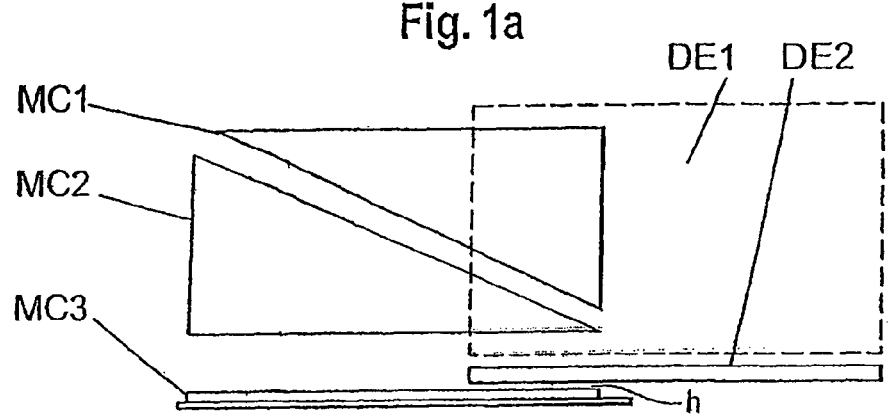
FIG. 1a and FIG. 1b depict a two-coil array having a measuring or damping element as part of the position measuring device.

FIG. 1a depicts the basic principle of a measuring coil MC1 that is partially covered by an eddy current damping element DE1. In this case, a second coil MC2 is also used as a measuring coil; its partial coverage opposes that of the first measuring coil MC1. Both coils are placed in a planar manner on a printed circuit board in a known manner; connector ends of the coil conductors are connected to capacitors and additional circuit components to oscillators. One winding can be enough for each coil; however, a plurality of windings can also form a flat spiral.

The two flat coils MC1 and MC2 have basic rectangular shapes and are arranged one after the other in a direction of measurement. The conductive eddy current damping element DE1 is guided as a movable measuring element at a predetermined spacing height above the flat coils MC1 and MC2. In accordance with one alternative measuring principle, the measuring element could also comprise a soft magnetic material such as ferrite. The measurement path on which a current position of the measuring element is to be determined is traveled within a measuring area that extends from nearly complete coverage of a measuring coil to nearly complete exposure of the coil. The two-coil array with opposing action in accordance with FIG. 1a is particularly suitable for a steeper characterizing line for the measuring device, that is, for higher sensitivity.

Figure 1B:
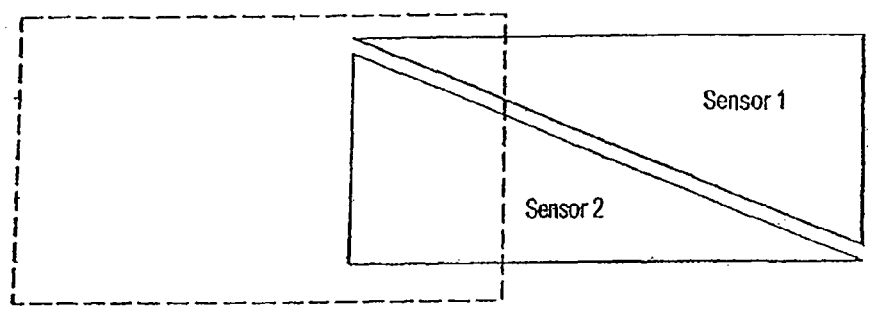
Figure 1C:
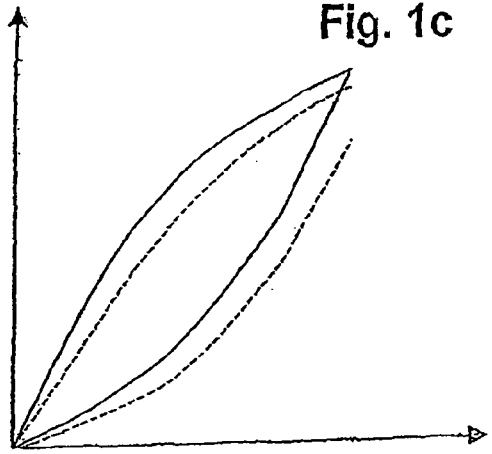
FIG. 1c depicts a characterizing line field of the output signal of sensors 1 and 2 in accordance with FIG. 1b as a function of their coverage by the damping element with a tilt of the damping element as parameter.

FIGS. 1a and 1b depict a differential coil array that is an alternative in terms of the abutment between the coils, MC1 and MC2, and that can also be used advantageously in the invention. In a manner known in and of itself the measuring coils, MC1 and MC2, have a basically triangular shape and are placed together, with a diagonal separation, forming a rectangular arrangement. Depending on the position of the measuring element, a signal course is oppositional and a differential signal is determined. In this case, the characterizing lines in accordance with FIG. 1c can assist in compensating a static (tolerance-induced) or dynamic (movement-induced) change in the spacing and/or in the tilt of the measuring element. As the side view in accordance with FIG. 1a indicates, the position measuring result is sensitive to deviations in a uniformly parallel spacing height h. The solid characterizing lines in the characterizing line field in accordance with FIG. 1c depict the opposing locational or coverage-dependent output signals of coils MC1 and MC2, for a uniformly parallel spacing height h. In comparison, the broken characterizing lines depict the idealized signal course with a tilt. In this exemplary embodiment a right-hand edge of the damping element DE2 is disposed higher than the left-hand edge of the damping element.

The two-coil array in accordance with FIG. 1 has been expanded to a four-coil array I-IV in FIG. 2. The movable measuring element ME1 is relatively longer than in FIG. 1; in this case it can cover two adjacent flat coils. The offset of the measuring coils transverse to the position measuring device is optional; in accordance with FIG. 15a the coils I-IV can also be disposed on a line. If the movable measuring element stops in the left-hand half of the measuring area, the upper coils I and III assume the function as measuring coils S1-S5, analogous to FIG. 1. Of the lower coils, coil II is completely covered and coil IV is not covered at all. Their signals can be used for reference signals in the evaluation circuit. The permanently damped coil II belongs to a high frequency oscillator, the signal of which is a measure for the spacing height of the movable measuring element over the entire coil array. The permanently undamped coil IV belongs to a low frequency oscillator, the signal of which is a measure for the environmental temperature and for other disturbance variables such as e.g. component aging.

The functions are reversed if the movable measuring element of the four-coil array is disposed in the right-hand part of the measuring area. The lower coils II and IV are partially and opposingly covered like a type of differential measuring coils, while the upper coils I and III can now be used as reference coils. This coil array is suitable when there is enough space available for the measuring device and when the measurement is to be particularly precise and particularly free of disturbance.

Figure 4C:
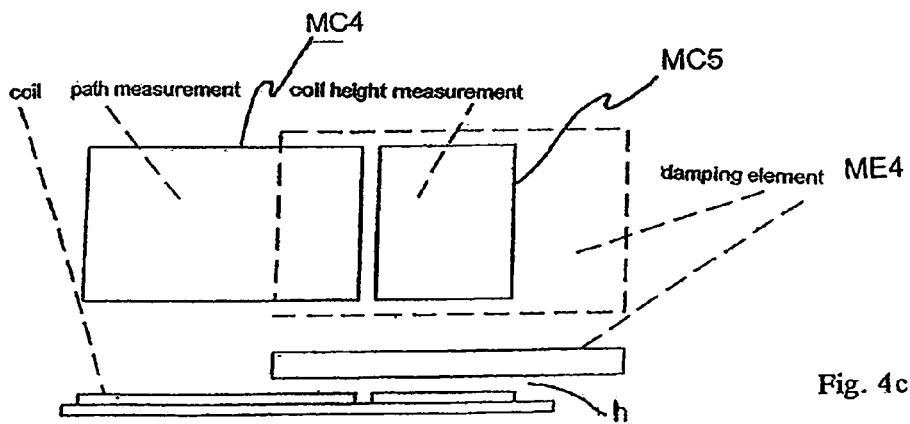
FIG. 4c is a side view of the partially damped measuring coil and the completely covered height measuring coil as in FIGS. 4a-4b.

FIG. 3 depicts another preferred possibility for the coil array having a measuring coil MC4, a high frequency coil MC5, and a low frequency coil MC6. FIGS. 4a and 4b depict an associated measuring element ME4 in two different positions in the measuring area. The measuring coil MC4 is damped as a function of the amount of coverage, so that its signal is primarily a function f(s) of the position s. However, the disturbances that derive from an unstable spacing height h and from an alternating operating temperature T also go into this measuring signal. The high frequency coil MC5, having the measuring function f(h) and being disposed in the vicinity of the measuring coil MC4, and the low frequency coil MC6, having the measuring function f(T) and being disposed far from the measuring coil, are suitable for obtaining signals for compensating these disturbances. The high frequency coil MC5 influenced by the measuring or damping element ME4 and the measuring coil MC4 are depicted in FIG. 4c in a side view as well in order to clarify the spacing height h. In practice, the damping element ME4 can tilt, both due to tolerances and dynamically due to the mechanical load. In some transmission sensors it is enough to take into account tilting in the direction of measurement s; in other transmission sensors the tilting can occur on a plurality of axes.

Figure 5:
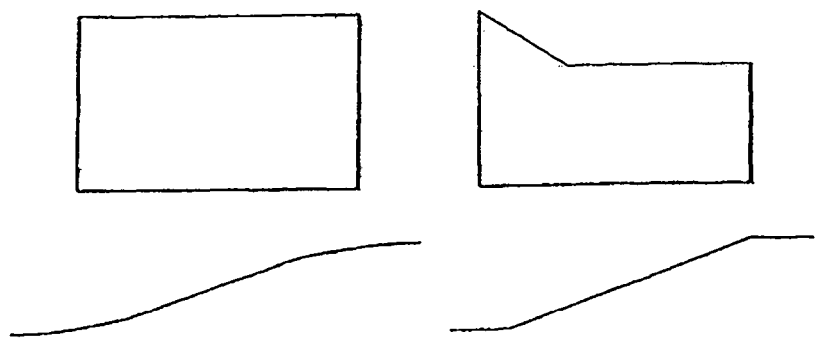
FIG. 5 depicts a measuring coil having a basic rectangular shape and alternatively a measuring coil having a trapezoidal expansion of the basic rectangular shape.

FIG. 5 depicts one possibility for changing a basic rectangular shape of a measuring coil in accordance with FIG. 1 and thus for improving the characterizing line. The symbolic depiction of the characterizing lines (also in FIG. 5) is provided more precisely in FIG. 6. The characterizing line diagram indicates the position s of the movable measuring element on the abscissa and provides on the ordinate the pulse frequency f of the digital oscillator that contains the partially covered measuring coil. Fundamentally the oscillator frequency f increases as the coverage s of the measuring coil by the measuring element increases. However, only a part of the transition area having a somewhat linear characterizing line can be used well as the measuring area. The modification of the basic rectangular shape of the measuring coil is suitable for making this measuring area as wide as possible and also for improving the linearity within the measuring area.

The curve at the end of the characterizing line can be shaped using the trapezoidal expansion in the outline on the left-hand end of the measuring area. The trumpet-shaped or trapezoidal shape in FIG. 5 is to be construed as an example; one skilled in the art can find the most favorable outline shape using simple tests.

The coil array selected for the application is arranged together with the other oscillator components and the digital evaluation circuit on a printed circuit board. The entire printed circuit board arrangement is inserted in an aluminum housing and cast. The measuring device thus assembled has a compact shape without moving parts. The movable measuring element can be defined simply in terms of shape and material so that it can be produced in an entirely different production process (for instance as a vane that is cast when casting a selector swing fork) and can still cooperate reliably and smoothly with the cast printed circuit board arrangement.

Figure 7:
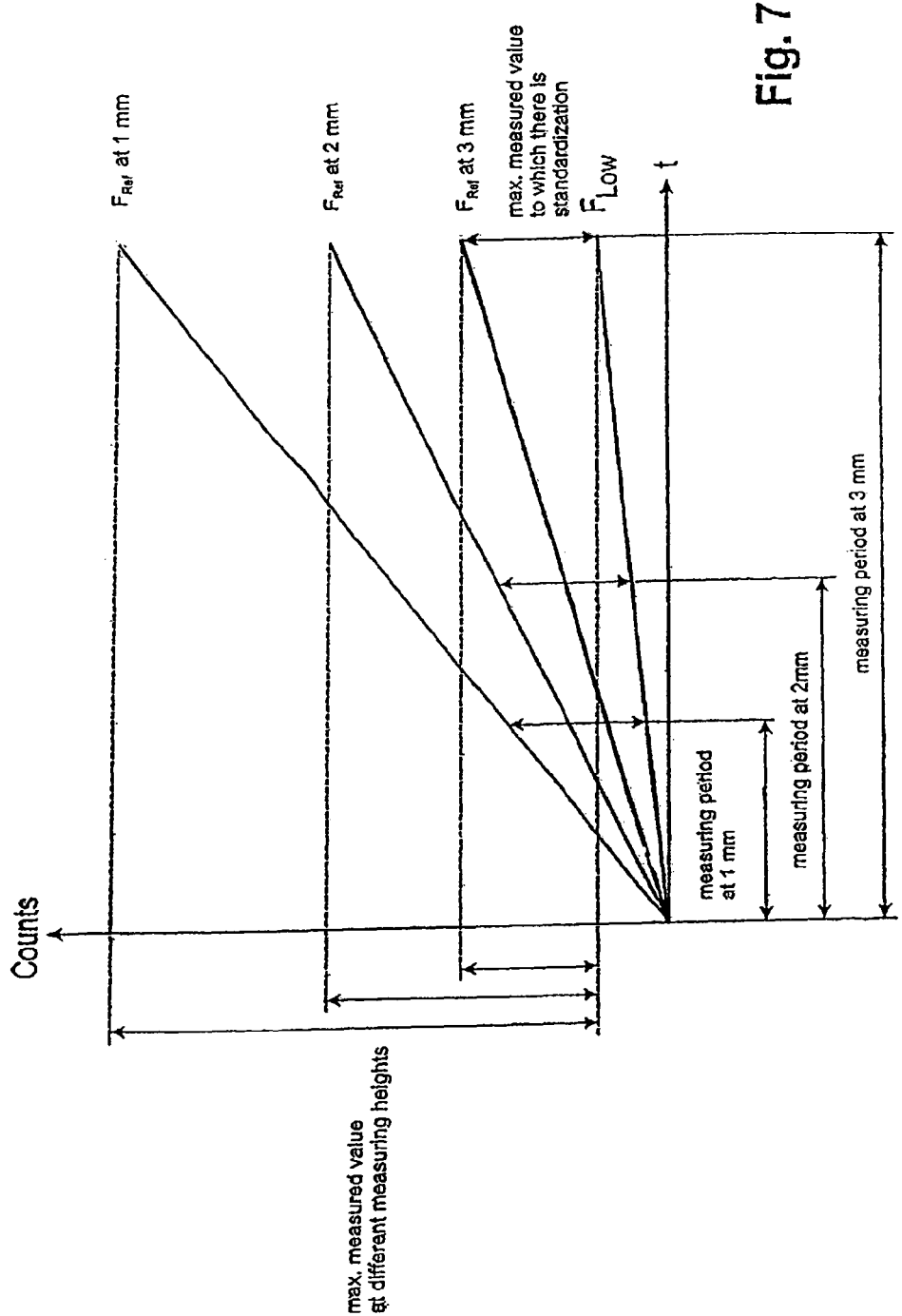
FIG. 7 is a diagram for the frequency counting of the reference oscillators under different measuring conditions.
Figure 8:
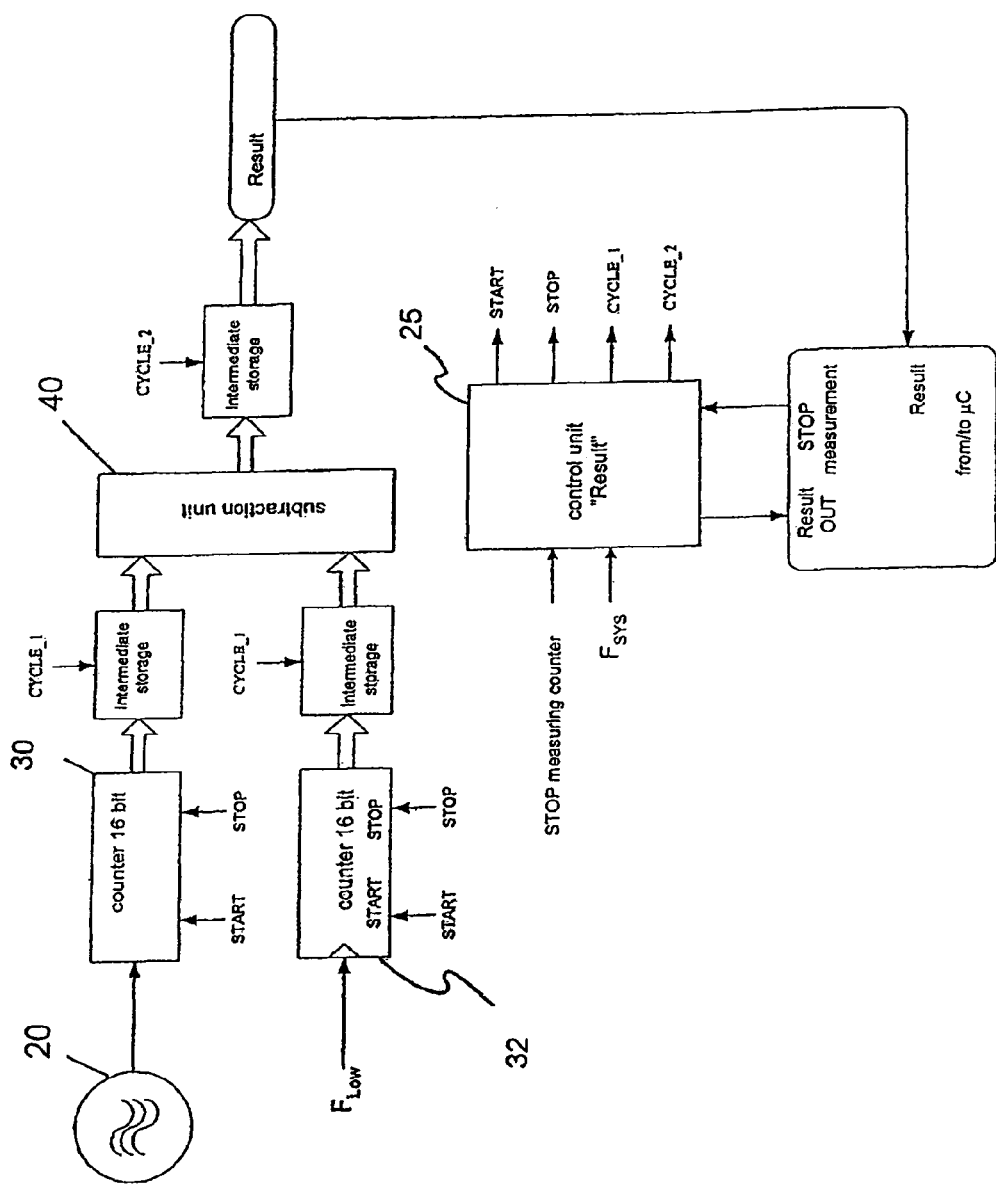
FIG. 8 is an electric circuit diagram of a first exemplary embodiment for calculating results in the evaluation circuit.
Figure 9:
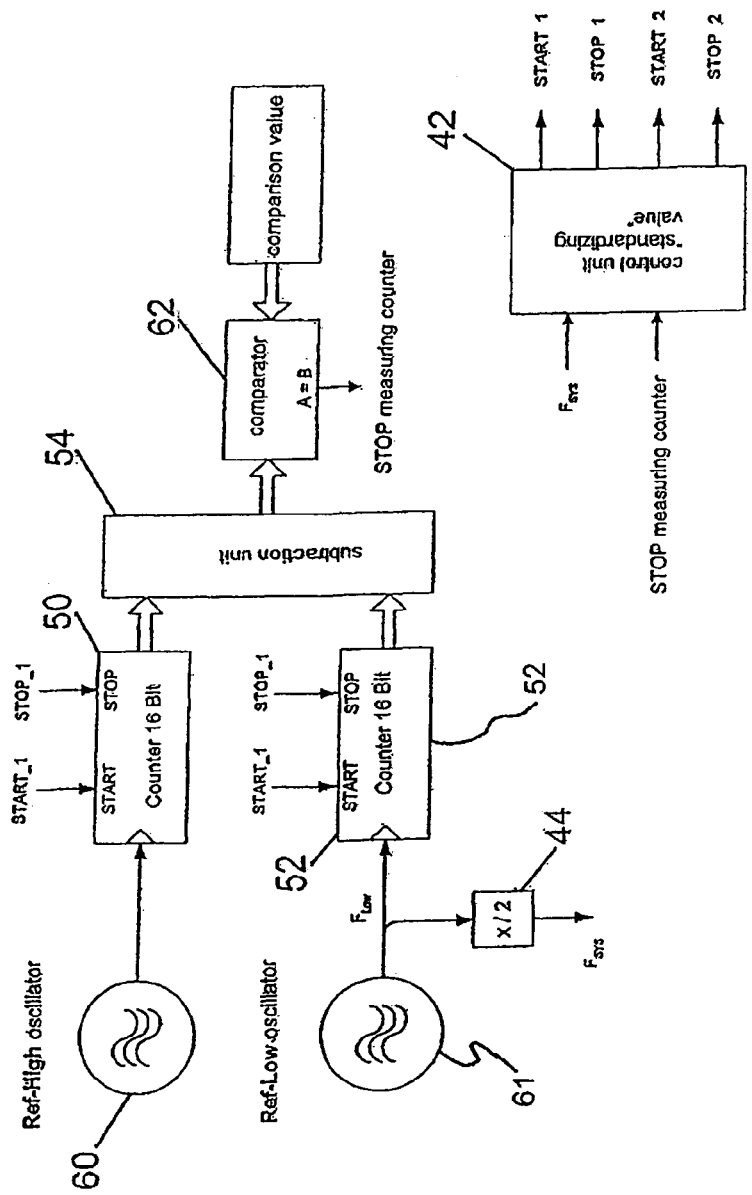
FIG. 9 is an electrical circuit diagram of the first exemplary embodiment for calculating standardizing value and measuring period in the evaluation circuit.

The block diagrams in accordance with FIGS. 8 and 9 depict how the signals from the oscillators are fed into the evaluation circuit. Each oscillator signal is supplied in the input stage to a frequency counter that counts the pulses during a certain measuring period. From the associated diagram in FIG. 7 can be seen how the counter readings for the two reference oscillators run up during the measuring period. The counter reading $F_{low}$ for the undamped low frequency oscillator increases most slowly. The increase in the high frequency oscillator is more rapid due to its complete coverage (lower inductivity means higher oscillator frequency). A spacing height of 3 mm is defined as the standard that guarantees the necessary position resolution. For this measuring condition a maximum measured value is provided to which all subsequent counting values are standardized. The maximum measured value is the difference between the counter readings of the high frequency oscillator and the low frequency oscillator that occurs during the measuring period. The counter reading for the partially covered measuring coil is consequently between these two environmentally defined limiting values.

Due to the aforesaid disturbing factors for the measuring element assembled independent from the coil array, the spacing height can be reduced from 3 mm to for instance 2 mm or 1 mm. Under these measuring conditions the counter readings for the high frequency oscillator increase more rapidly. Since the evaluation circuit retains the maximum measured value to which standardization is performed, the measuring period grows shorter under these measuring conditions. In the first exemplary embodiment of the evaluation circuit (FIGS. 8 and 9) it is determined, for instance given the calibration of the measuring device and also continuously during the measurement, that the spacing height and thus the measuring period are near the established standard range. Thus the exemplary embodiment in accordance with FIGS. 8 and 9 is sufficient for the evaluation circuit. A second exemplary embodiment will be discussed using FIGS. 10 and 13, and it leads to a division in results for other measuring conditions that vary from the standard.

In FIG. 8, the signals from a measuring oscillator 20 and from a low frequency oscillator are processed to create the position measurement result. The pulse frequencies are counted in the input stage. For this, a "Result" control unit 25 supplies start and stop signals for the counters 30 and 32, which is why it requires a general system frequency $F_{sys}$ and information about the measuring period, both of which are derived from the circuit in accordance with FIG. 9. In accordance with FIG. 7, the asynchronous counter 32 for the low frequency oscillator 61 runs up in the maximum measuring period and supplies a reference value that reflects the ambient temperature. The signal from the measuring oscillator 20 also contains in the counter reading of its asynchronous counter 30 the influence of the partial coverage by the measuring element. In accordance with FIG. 8 a subtraction unit 40 supplies a differential value that is independent of temperature. For recalibrating or adapting the measuring period, the part of the evaluation-circuit is used that is depicted in FIG. 9. The system frequency $F_{sys}$ is derived from the frequency $F_{low}$ from the low frequency oscillator 61 and is used to clock the "Standardizing value" control unit 42 (FIG. 9) and the "Result" control unit 25 (FIG. 8). No separate cycle oscillator is required. The pulse frequency for the low frequency oscillator 61 can be used directly for system frequency $F_{sys}$, or a frequency divider 44 can also be interposed. In FIG. 9 the lowest of the oscillator frequencies is divided in two to generate the system clock.

Asynchronous counters 50 and 52 in the input stage and the subtraction unit 54 in FIG. 9 are comparable to FIG. 8, but instead of the measuring oscillator, the high reference oscillator 60 supplies the maximum possible count value (see FIG. 7). If this difference attains a prespecified maximum value, a comparator 62 supplies information about the measuring period (Stop Measuring Counter). This measuring period information is required by the control units 25 and 42 in FIG. 8 and FIG. 9 in order to determine the start and stop signals for the counters 30, 32, 50 and 52 and the transfer signals for the memories upstream and downstream of the subtraction units 40 and 54.

The evaluation circuit in accordance with FIGS. 8 and 9 can be a gate array (GA), field programmable gate array (FPGA), or application specific integrated circuit (ASIC). In the preferred embodiment gate arrays are provided as asynchronously running evaluation circuits close to the sensor.

Figure 10:
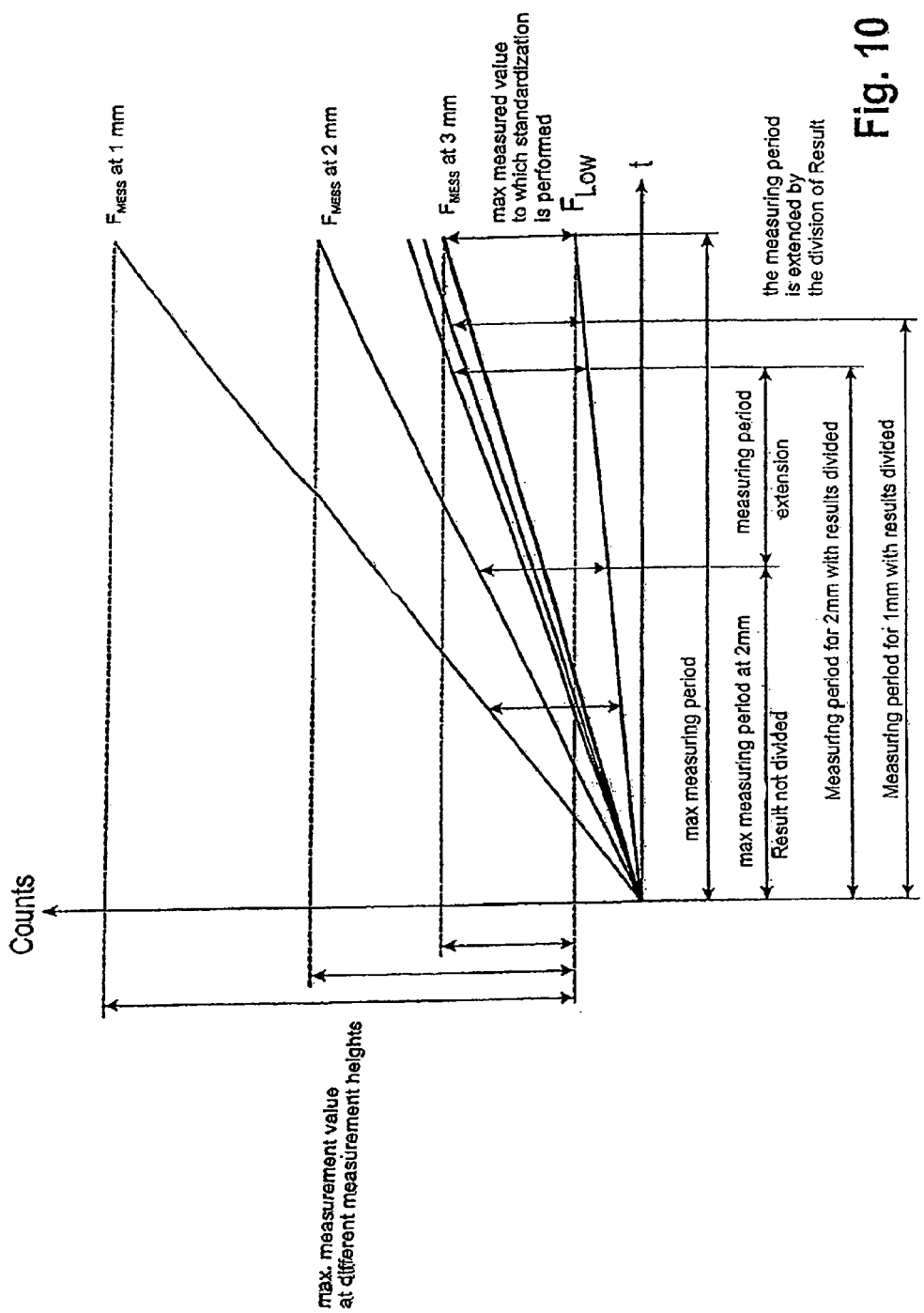
FIG. 10 is a counting diagram as in FIG. 7, of a second embodiment of the evaluation circuit.

FIG. 10 depicts a variant of the measuring period calculation that is used when the spacing height is to be reduced to 2 mm or 1 mm due to mechanical tolerances. In this case the counter readings would increase beyond the established maximum value. A division of the result provides for this circumstance in a second exemplary embodiment of the evaluation circuit. So that the counter readings attained in the somewhat extended measuring period remain comparable and do not exceed the established standardization value, the evaluation in accordance with FIG. 11 also includes a divider 70 for a division of the subtraction result. The division factor 4 is used for high frequencies in a frequency range f3 (see FIG. 13); the division factor 2 is fed into the calculation for less high frequencies in a frequency range f2 (see FIG. 13 again). The division factor 1 is used in the frequency range f1 that is used as the standard, i.e. it is already done using the calculation explained with FIG. 8.

Figure 11:
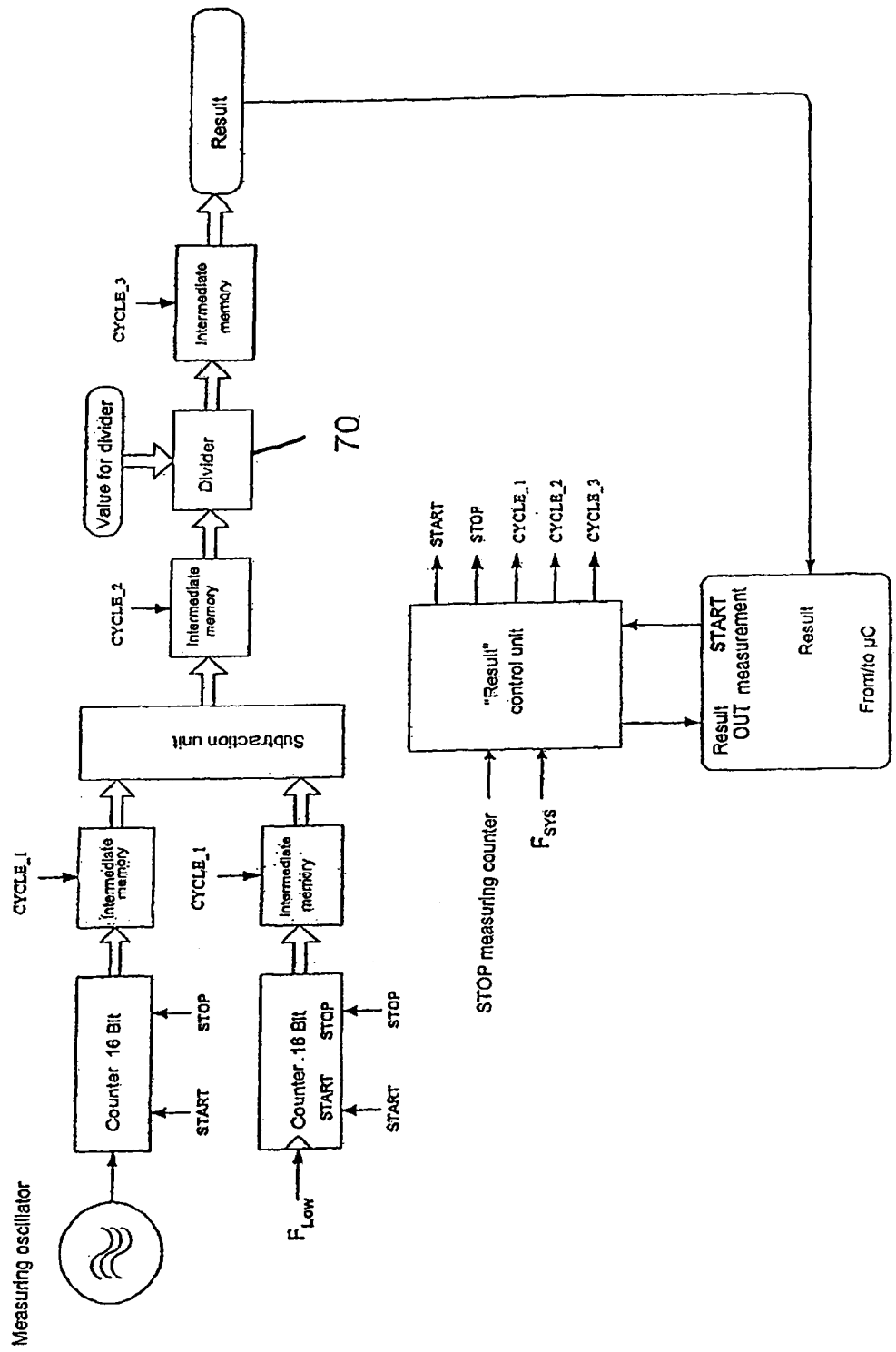
FIG. 11 is an electrical circuit diagram of the second exemplary embodiment for calculating results in the evaluation circuit.
Figure 12:
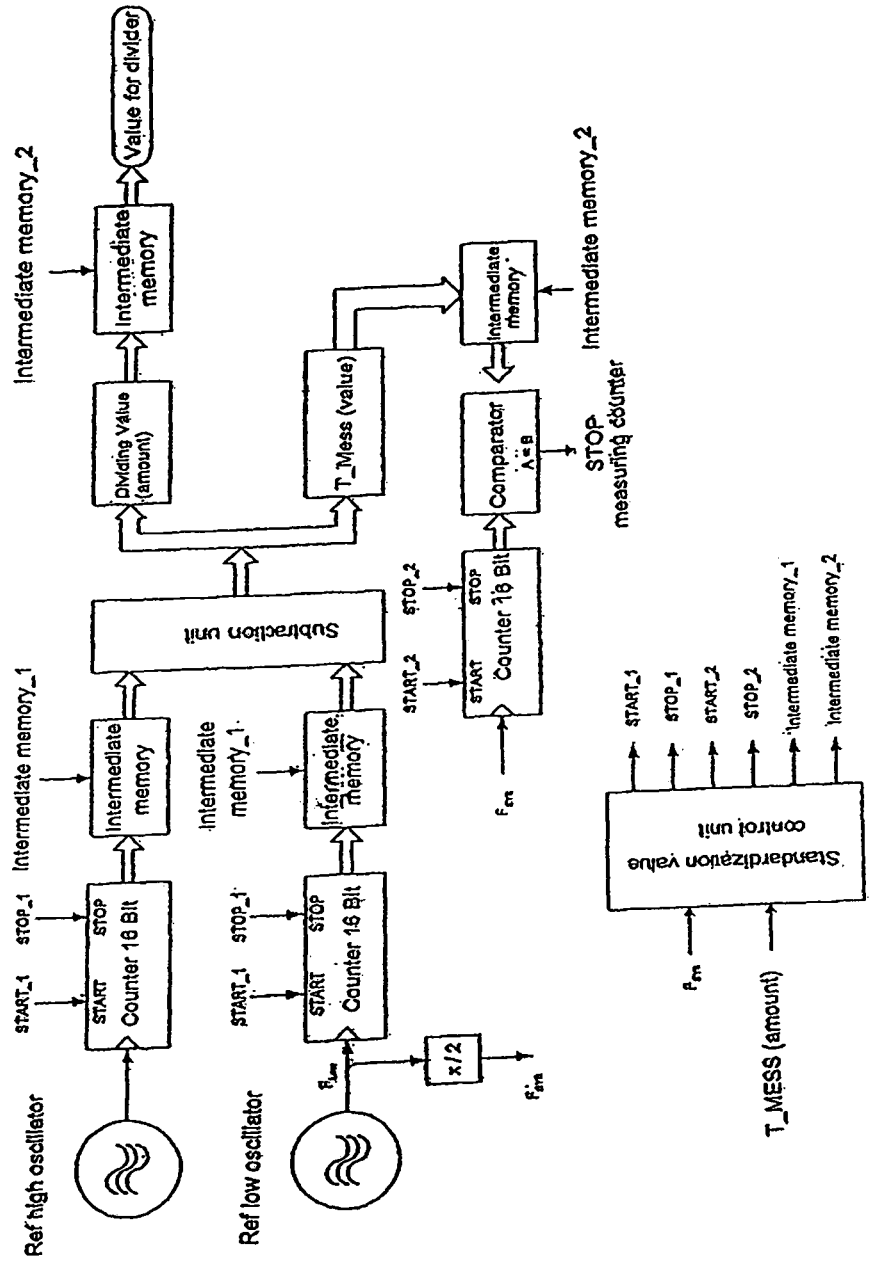
FIG. 12 is an electrical circuit diagram of the second exemplary embodiment for calculating standardization value and measuring period in the evaluation circuit.

The calculation of the measuring period is more complicated in the second exemplary embodiment (see FIG. 12). In this case the calculation of the difference between the high frequency oscillator and the low frequency oscillator exceeds the frequency range f1 in FIG. 13 and has two consequences. First, the value of the divisor that is needed for the additional division process in FIG. 11 is found from this difference. Second, measuring period information that is supplied to the "Standardization value" and "Result" control units is found in a special calculation.

When used as a transmission sensor, the movable measuring element is not assembled together with the printed circuit board that bears the inductive sensors. On the contrary, the plate is attached to the swing arm of the dual clutch transmission. The distance between the sensor coils, which is important in terms of function, is relatively variable after assembly, and a relative tilt of the measuring element is to be taken into account that can lead to the distance from the measuring element to the measuring coil being smaller than the distance to the reference coil. For compensation, one additional reference coil per tilt direction is required; it is used to determine the actual spacing in the area of the measuring coil. The spacing height and tilt disturbance variables can even change dynamically, i.e. during the operation-induced measuring movement, if the measuring movement does not occur entirely parallel to the plane of the flat coils.

Figure 6:
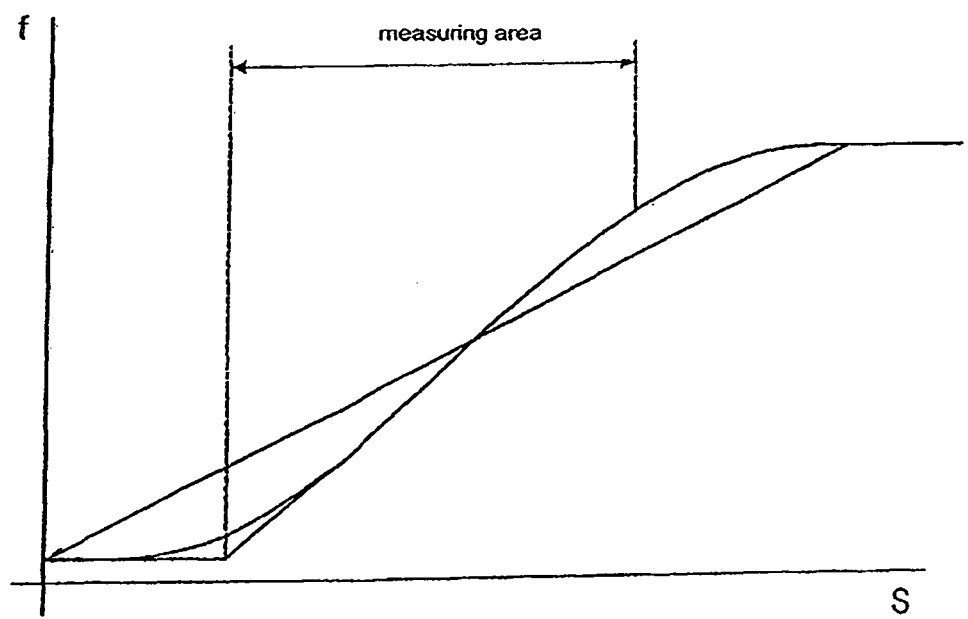
FIG. 6 is a diagram of the characterizing line of an inventive measuring oscillator.
Figure 14A:
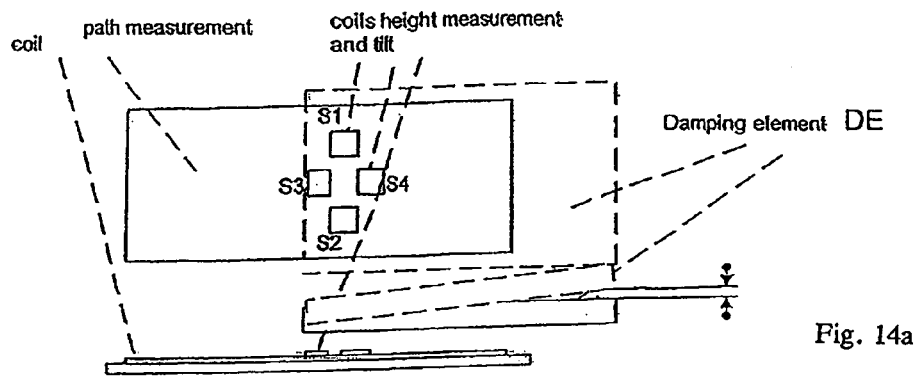
FIG. 14a depicts a multi-coil array comparable to that in FIG. 4a, the height measuring coil from FIG. 4a being replaced by four height measuring coils.

FIG. 14a depicts a coil array that is functionally comparable to FIG. 4b and with which not only can the disturbance be compensated by a change in the parallel spacing height h but also the additional disturbance can be compensated by a tilt angle. The one height measuring coil in accordance with FIG. 4a is replaced in this case with three or more high frequency coils, four high frequency coils S1 through S4 in the preferred exemplary embodiment. The tilt in two axes is created using different heights for the measuring element (damping element) via the high frequency coils S1 through S4. Again, the differential signals are measured. In the associated FIG. 14b, a linear part of the characterizing line in accordance with FIG. 5 and FIG. 6 is depicted. In the example, the tilt in the direction of the sensors S3-S4 is greater than the tilt in the direction of the sensors S1-S2. Consequently the differential signal S3-S4 is greater in the associated characterizing line field in accordance with FIG. 14b. Using the established tilt, it is then possible to deduce from the actual signal course with tilt a theoretical, undisturbed, ideal signal course without tilt. The actual measuring signal depicts the difference between the frequency of the measuring oscillator and the frequency of a high frequency oscillator, for instance the frequency in the reference coil S3.

Figure 14B:
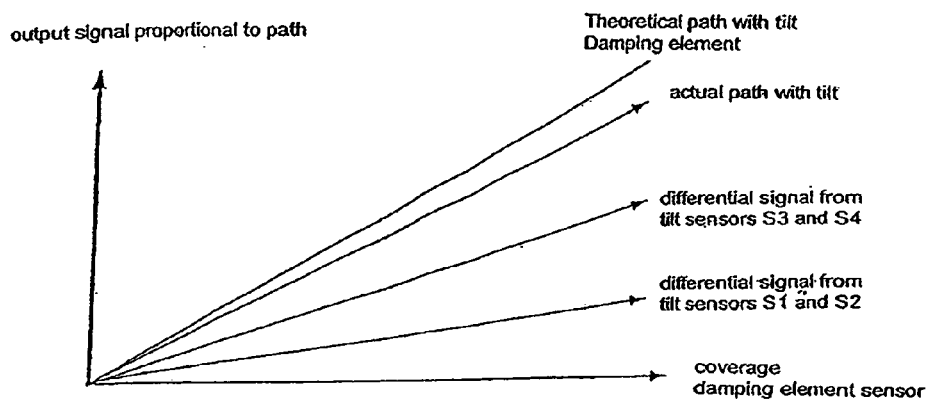
FIG. 14b depicts a linear characterizing line as in the linear area of the characterizing line in FIG. 6, but with an additional effect of tilting the measuring element in any direction.
Figure 15A:
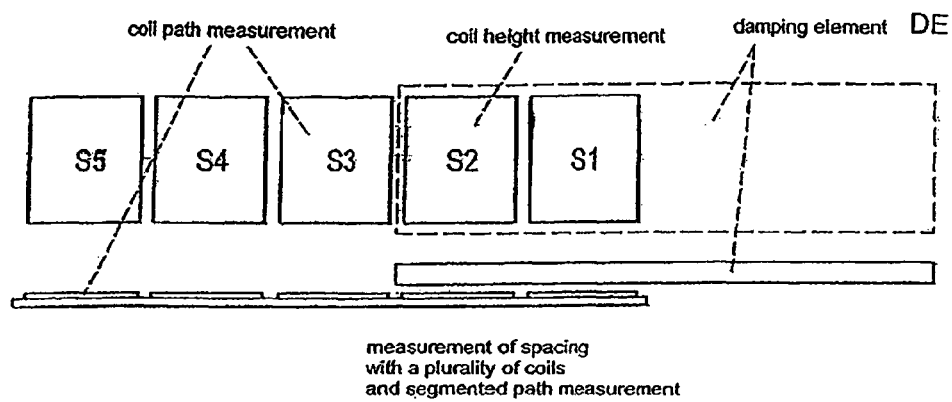
FIG. 15a depicts a multi-coil array comparable to that in FIG. 2, the height measuring coil from FIG. 2 being replaced by two height measuring coils.
Figure 15B:
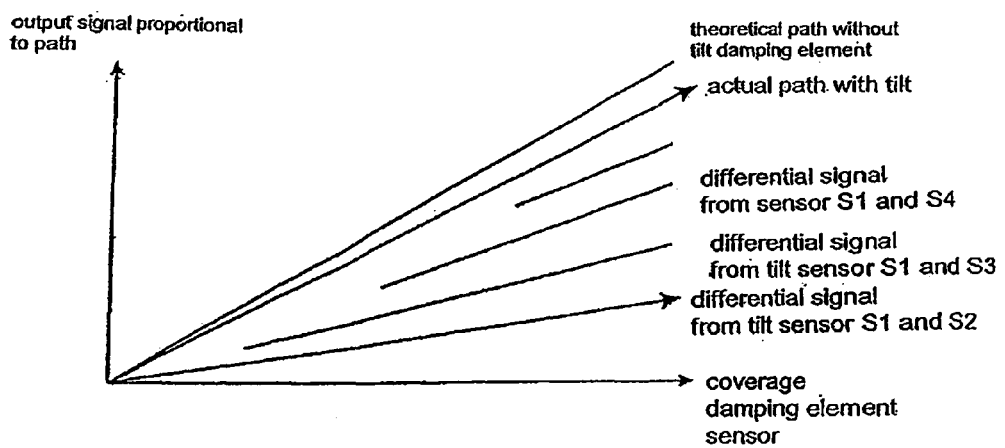
FIG. 15b depicts a linear characterizing line as in the linear area of the characterizing line in FIG. 6, but with an additional effect of tilting the measuring element in a primary direction.

FIGS. 15a and 15b similarly depict tilt compensation for only one primary direction. Frequently the tilt occurs only such that a tilt signal S1-S2 in FIG. 14b is zero. Therefore a plurality of coils are arranged in series in FIG. 15a and are operated such that the only partially covered coil (e.g. S3) measures the path, while the completely covered coils (e.g. S1 and S2) establish the spacing of the measuring element. In another embodiment the coils S1 through S4 can also be arranged on an arc or circumference of a circle so that the position measuring device becomes a goniometer.

When the damping element DE is tilted, the tilt angle can be calculated using different heights h1, h2 that the completely damped coils S1, S2 supply. Thus the path signal of the coil S3 can be corrected. The greater the number of coils that are completely covered, the more precise this height measurement and this correction.

Figure 16:
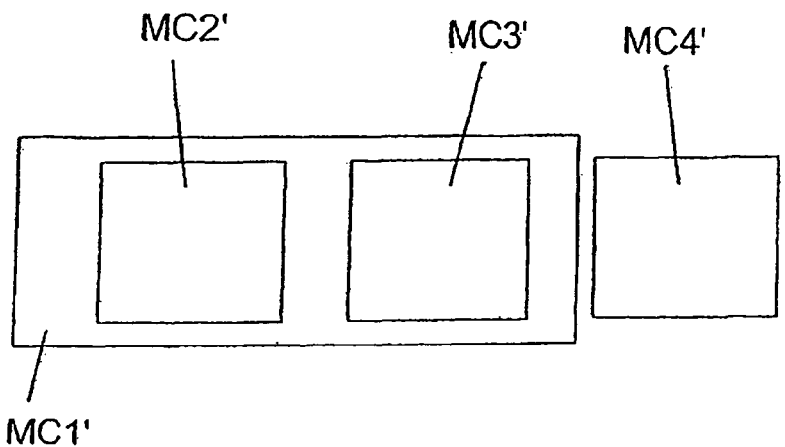
FIG. 16 is an array of a measuring coil in accordance with the invention having a redundant, segmented measuring coil array.

In FIG. 15a, in the depicted measuring position, the (completely covered) coils S1 and S2 can be considered height measuring coils, while the adjacent coils S3, S4, and S5 provide a segmented path measurement because they are partial covered one after the other. Such a combination of height coils with segmented path measurement can also be part of a redundant path measurement as depicted in FIG. 16. In this case redundant path measurement means that, in addition to the normal measuring coil MC1', another coil array MC2' is arranged in the same measuring area in another plane, above or below the first measuring coil MC1'. The measuring areas of the two redundant coil arrays can also only partially overlap, which is indicated in FIG. 16 by the measuring coil MC4'.

FIGS. 17a through 17c depict the redundant measuring coil array of FIG. 16 as it is covered by the movable measuring element DE in three different position measuring locations. The three illustrated positions for the measuring or actuating element cover DE the measuring area for the primary measuring coil MC1'. In addition, the redundant measuring coils MC2' and MC3' are used as a segmented coil array that has approximately the same measuring area as the primary measuring coil MC1'. If the measuring coil MC1' fails, the position can still be measured using the redundant measuring coils MC2' and MC3'.

The measuring coil MC4' in this area acts as a height measuring coil for correcting changes in spacing, as described in the foregoing. In the last position in accordance with FIG. 17c (that is, during the transition from the center position in accordance with FIG. 17b to the final position in accordance with FIG. 17c), the measuring coil MC3', which is then always covered, assumes the function of the height measuring coil.

Figure 17:
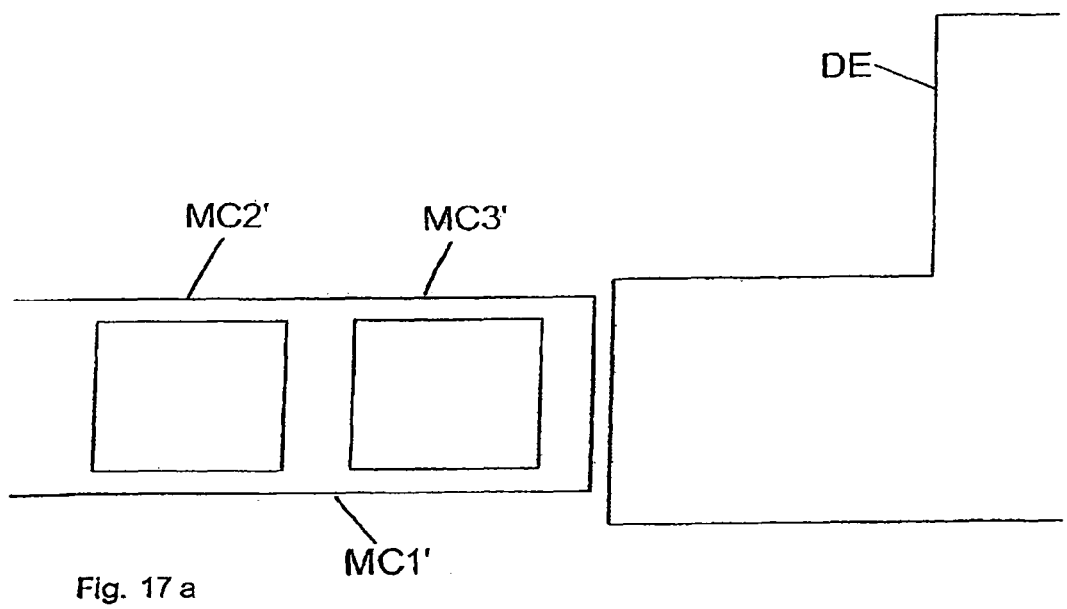
FIGS. 17a-c depict the redundant measuring coil array in accordance with FIG. 16 having a movable measuring element in three different positions of coverage.
Figure 17:
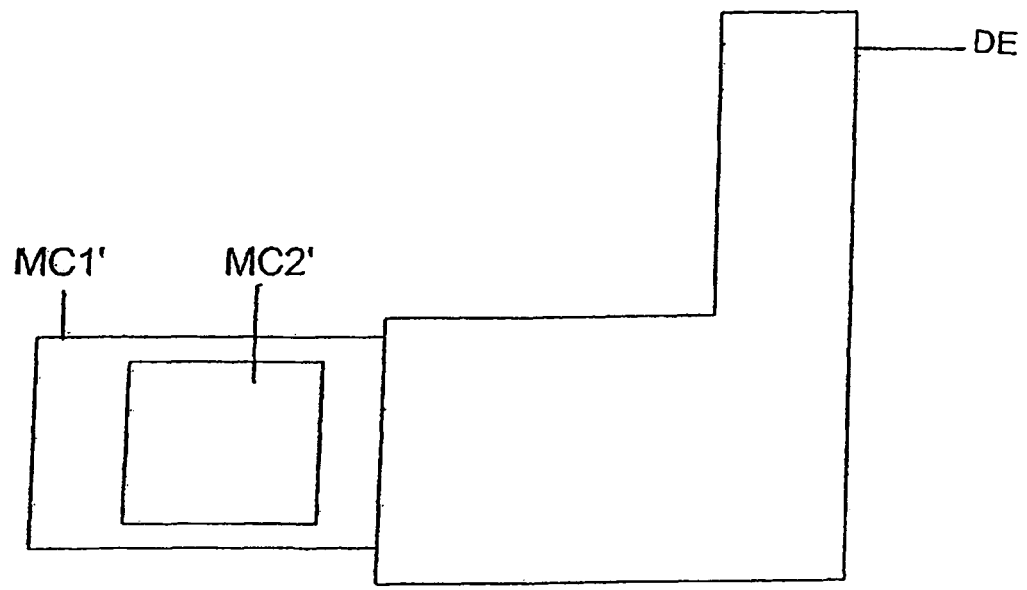
Figure 17:
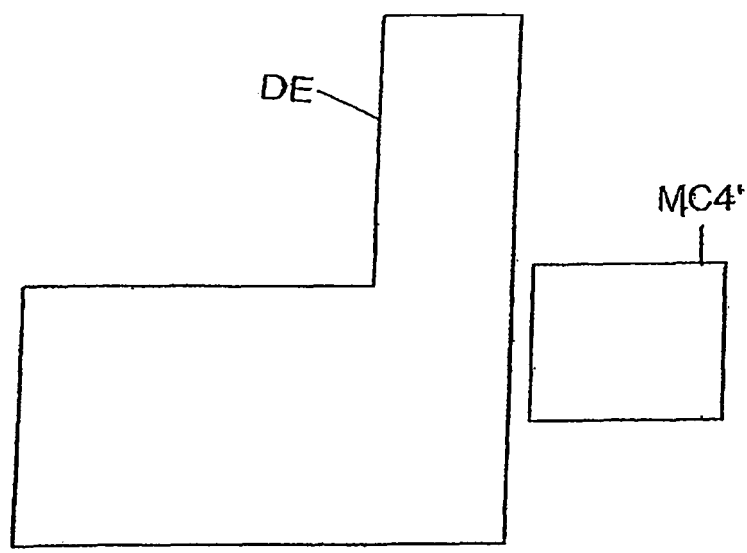

Thus, in summary it can be determined with respect to FIGS. 16 and 17 that using a height measuring coil it is also possible to determine the plausibility of the presence of a movable damping or measuring element. The position of the damping element DE can also be provided more roughly with a plurality of height coils. With respect to safety-related systems, classification according to SIL is 1 through 3, this standard IEC-61508 requiring software to run independently and requiring independent hardware paths in order to enable another fall-back position if there is a failure in the evaluation path. This requirement is satisfied in the redundant array in accordance with FIGS. 16 and 17, as it can be used for transmission sensors, in that the actual path sensor unit may fail and it is still possible to have a rough position of the actuator (right, center, left). In the position in accordance with FIG. 17a, the path coil MC1' is only slightly damped and the height coil MC4' is completely damped by the damping element DE. Thus it is possible using the height coil MC4' to also determine that the system is situated in the area on the right. If the damping element is in the center (FIG. 17b), the path coil MC1' is partially damped, while the coils MC3' and MC4' as height coils are completely damped. Thus it is possible via the height coils MC3' and MC4' to determine redundantly that the system is in the center area. If the damping element DE is on the left (FIG. 17c), the path coil MC1' is completely damped and the height coils MC2' and MC3' are also completely damped. Thus it is possible via the height coils MC2' and MC3' to determine redundantly or in addition that the system is in the area on the left.

The invention claimed is:

1. An inductive position measuring device comprising:
a measuring element which is movable;
at least first and second digital oscillators respectively having first and second measuring coils and producing first and second pulse frequencies;
said first oscillator having said first measuring coil included such that changes in said first pulse frequency of the first oscillator are generated due to changes in inductivity that are generated by said measuring element depending on an amount of coverage between said first measuring coil and said measuring element;
said second oscillator functioning as one of:
a measuring oscillator having said second measuring coil variably covered by said measuring element so that said second pulse frequency is a function of the variable coverage; or
a reference oscillator and having said second measuring coil as a reference coil being defined by either being completely covered or being not covered at all by said measuring element so that said second pulse frequency of said second oscillator is not a function of an amount of coverage of said second measuring coil by said measuring element; and
a digital evaluation circuit in which the first and second pulse frequencies are counted and tallied, wherein as a low reference oscillator said second oscillator contains said second measuring coil as a reference coil that is not covered by said movable measuring element so that said second pulse frequency is a low frequency reference that compensates frequency-influencing parameters including ambient temperature and component aging.

2. The inductive position measuring device in accordance with claim 1, wherein operation of the evaluation circuit is cycled using a system frequency that is derived from one of the first and second pulse frequencies.

3. An inductive position measuring device comprising:
a measuring element which is movable;
at least first and second digital oscillators respectively having first and second measuring coils and producing first and second pulse frequencies;
said first oscillator having said first measuring coil included such that changes in said first pulse frequency of the first oscillator are generated due to changes in inductivity that are generated by said measuring element depending on an amount of coverage between said first measuring coil and said measuring element;
said second oscillator functioning as one of:
a measuring oscillator having said second measuring coil variably covered by said measuring element so that said second pulse frequency is a function of the variable coverage; or
a reference oscillator and having said second measuring coil as a reference coil being defined by either being completely covered or being not covered at all by said measuring element so that said second pulse frequency of said second oscillator is not a function of an amount of coverage of said second measuring coil by said measuring element; and
a digital evaluation circuit in which the first and second pulse frequencies are counted and tallied wherein, as a high reference oscillator, said second oscillator contains said second measuring coil as a reference coil that is completely covered by said movable element so that said second pulse frequency is a high frequency reference that compensates undesired changes in a spacing height from said first and second measuring coils to said measuring element.

4. An inductive position measuring device comprising:
a measuring element which is movable;
at least first and second digital oscillators respectively having first and second measuring coils and producing first and second pulse frequencies;

said first oscillator having said first measuring coil included such that changes in said first pulse frequency of the first oscillator are generated due to changes in inductivity that are generated by said measuring element depending on an amount of coverage between said first measuring coil and said measuring element;

said second oscillator functioning as one of:
  a measuring oscillator having said second measuring coil variably covered by said measuring element so that said second pulse frequency is a function of the variable coverage; or
  a reference oscillator and having said second measuring coil as a reference coil being defined by either being completely covered or being not covered at all by said measuring element so that said second pulse frequency of said second oscillator is not a function of an amount of coverage of said second measuring coil by said measuring element;

a digital evaluation circuit in which the first and second pulse frequencies are counted and tallied; and a third oscillator having a third measuring coil and producing a third pulse frequency;

wherein, as a low reference oscillator, said second oscillator contains said second measuring coil as a reference coil that is not covered by said movable measuring element so that said second pulse frequency compensates frequency-influencing parameters including ambient temperature and component aging; and wherein, as a high reference oscillator, said third oscillator contains said third measuring coil as a reference coil that is completely covered by said movable element so that said third pulse frequency of said high reference oscillator compensates undesired changes in a spacing height from said first and third measuring coils to said measuring element.

5. An inductive position measuring device, comprising:
a measuring element which is movable;
at least first and second digital oscillators respectively having first and second measuring coils and producing first and second pulse frequencies;
said first oscillator having said first measuring coil included such that changes in said first pulse frequency of the first oscillator are generated due to changes in inductivity that are generated by said measuring element depending on an amount of coverage between said first measuring coil and said measuring element;
said second oscillator functioning as one of:
  a measuring oscillator having said second measuring coil variably covered by said measuring element so that said second pulse frequency is a function of the variable coverage; or
  a reference oscillator and having said second measuring coil as a reference coil being defined by either being completely covered or being not covered at all by said measuring element so that said second pulse frequency of said second oscillator is not a function of an amount of coverage of said second measuring coil by said measuring element;
a digital evaluation circuit in which the first and second pulse frequencies are counted and tallied; and
a third oscillator having a third measuring coil and producing a third pulse frequency;
wherein, as a high reference oscillators, said second oscillator and said third oscillator respectively include said second and third measuring coils as reference coils that are not completely covered by said movable measuring element so that the second and third pulse frequency of said high reference oscillators compensate undesired changes in a spacing height from said first, second and third measuring coils to said measuring element and compensate undesired tilting of said measuring element in a measuring direction.

6. The inductive position measuring device in accordance with claim 5, further comprising:
a fourth oscillator having a fourth measuring coil and producing a fourth pulse frequency; and
said fourth oscillator functioning as a high reference oscillator having said fourth measuring coil as a reference coil that is completely covered by said movable measuring element so that the fourth pulse frequency of said high reference oscillator also compensates undesired changes in said spacing height from said coils to said measuring element and compensates undesired tilting of said measuring element in any direction.

7. An inductive position measuring device comprising:
a measuring element which is movable;
at least first and second digital oscillators respectively having first and second measuring coils and producing first and second pulse frequencies;
said first oscillator having said first measuring coil included such that changes in said first pulse frequency of the first oscillator are generated due to changes in inductivity that are generated by said measuring element depending on an amount of coverage between said first measuring coil and said measuring element;
said second oscillator functioning as one of:
  a measuring oscillator having said second measuring coil variably covered by said measuring element so that said second pulse frequency is a function of the variable coverage; or
  a reference oscillator and having said second measuring coil as a reference coil being defined by either being completely covered or being not covered at all by said measuring element so that said second pulse frequency of said second oscillator is not a function of an amount of coverage of said second measuring coil by said measuring element;
a digital evaluation circuit in which the first and second pulse frequencies are counted and tallied, wherein said first and second measuring coils are arranged adjacent each other in a direction of movement of said measuring element such that partial coverage of one of said first and second measuring coils increases while partial coverage of another one of said first and second measuring coils decreases with movement of said measuring element in a given direction so that the first and second pulse frequencies oppose one another in charge.

8. The inductive position measuring device in accordance with claim 1, wherein the first and second pulse frequencies respectively of the measuring coil of the first oscillator and of the uncovered reference coil of the second oscillator are subtracted to obtain a measuring result in which frequency-influencing parameters including ambient temperature and component aging are compensated.

9. The inductive position measuring device in accordance with claim 2, wherein the system frequency is derived from the second pulse frequency of said second oscillator.

10. The inductive position measuring device in accordance with claim 4, wherein the second and third pulse frequencies are tallied to obtain a maximum measurement result that is used as a standardization value for adapting a measuring period for counting the pulse frequencies of said oscillators.

11. The inductive position measuring device in accordance with claim 4, wherein said first, second and third coils are arranged in a planar manner on a printed circuit board.

12. The inductive position measuring device in accordance with claim 4, wherein at least one of said first second and third coils is mounted as a discrete component on a printed circuit board so as to be soldered in a manner of a surface mount device.

13. The inductive position measuring device in accordance with claim 12, wherein two other coils of said first, second and third coils are etched in a planar manner on said printed circuit board.

14. The inductive position measuring device in accordance with claim 5, wherein said first measuring coil is a planar measuring coil having a basic rectangular shape portion that is expanded in a partially covered end area into a trapezoidal shape in the end area.

15. The inductive position measuring device in accordance with claim 3, wherein each of said first and second digital oscillator further includes two frequency-determining capacitors, one resistance, and one inverter, in addition to said first and second measuring or reference coil.

16. The inductive position measuring device in accordance with claim 3, wherein said digital evaluation circuit includes asynchronous counters counting said first and second pulse frequencies.

17. The inductive position measuring device in accordance with claim 3, wherein said evaluation circuit includes a synchronous part cycled with a system frequency that is derived directly or by means of a digital divider from one of said the first and second pulse frequencies.

18. The inductive position measuring device in accordance with claim 6, further comprising a fifth oscillator as a high frequency oscillator producing a fifth frequency and having a fifth coil as a reference coil that is completely covered by said movable measuring element so that compensating a mean spacing and a tilt is done using four spacing measurements and transposed in a calculation to an area of one of said measuring coils.

19. The inductive position measuring device in accordance with claim 6, further comprising, as measuring oscillator, another oscillator having another measuring coil and producing another pulse frequency, said first and said another measuring coils being arranged proximate each other along the direction of movement of said measuring element such that partial coverage of one of said first and another measuring coils increases while partial coverage of another one of said first and another measuring coils decreases as said measuring element moves in a given direction so that the first and the another pulse frequencies to be evaluated change in opposition to one another.

20. The inductive position measuring device in accordance with claim 19, further comprising additional measuring coils in the direction of movement of said measuring element.

21. The inductive position measuring device in accordance with claim 19 wherein said first and another measuring coils are planar measuring coils and have a basic rectangular shape.

22. The inductive position measuring device in accordance with claim 21 wherein said planar measuring coils have said basic rectangular shape expanded in an end area.

23. The inductive position measuring device in accordance with claim 22, wherein said planar measuring coils are expanded trapezoidally in said end area.

24. The inductive position measuring device in accordance with claim 19 wherein said first and another measuring coils have a basic triangular shape and are arranged adjacent one another, with a diagonal separation, as differential coils.

25. The inductive position measuring device in accordance with claim 1, wherein said second measuring coil is arranged below or above said first measuring coil in a measuring area.

26. An inductive position measuring device, comprising:
a measuring element which is movable;
at least first and second digital oscillators respectively having first and second measuring coils and producing first and second pulse frequencies;
said first oscillator having said first measuring coil included such that changes in said first pulse frequency of the first oscillator are generated due to changes in inductivity that are generated by said measuring element depending on an amount of coverage between said first measuring coil and said measuring element;
said second oscillator functioning as one of:
a measuring oscillator having said second measuring coil variably covered by said measuring element so that said second pulse frequency is a function of the variable coverage; or
a reference oscillator and having said second measuring coil as a reference coil being defined by either being completely covered or being not covered at all by said measuring element so that said second pulse frequency of said second oscillator is not a function of an amount of coverage of said second measuring coil by said measuring element; and
a digital evaluation circuit in which the first and second pulse frequencies are counted and tallied;
said second measuring coil being arranged below or above said first measuring coil in a measuring area; and
one or a plurality of additional measuring coils disposed in a row with said second measuring coil.

27. The inductive position measuring device in accordance with claim 26, wherein said second coil and said one or a plurality of additional measuring coils are arranged for segmented path measurement.

28. The inductive position measuring device in accordance with claim 27, wherein said second coil and said one or a plurality of additional measuring coils at least partially overlap said first measuring coil.

29. The inductive position measuring device in accordance with claim 28, wherein said second coil and said one or a plurality of additional measuring coils form a segmented coil array that is longer than said movable measuring element in the direction of measurement.

30. The inductive position measuring device in accordance with claim 4, further comprising, as a measuring oscillator, another oscillator having another measuring coil and producing another pulse frequency, said first and said another measuring coils being arranged proximate each other along the direction of movement of said measuring element such that partial coverage of one of said first and another measuring coils increases while partial coverage of another one of said first and another measuring coils decreases as said measuring element moves in a given direction so that the first and the another pulse frequencies to be evaluated change in opposition to one another.

31. The inductive position measuring device in accordance with claim 18, further comprising, as a measuring oscillator, another oscillator having another measuring coil and producing another pulse frequency, said first and said another measuring coils being arranged proximate each other along the direction of movement of said measuring element such that partial coverage of one of said first and another measuring coils increases while partial coverage of another one of said first and another measuring coils decreases as said measuring element moves in a given direction so that the first and the another pulse frequencies to be evaluated change in opposition to one another.

32. The inductive position measuring device in accordance with claim 4, wherein the digital evaluation circuit comprises:
a measurement period generating circuit producing timing signals delineating a measurement period;
a low reference frequency counter configured to count pulses of said second pulse frequency during said measurement period as a lower limit value for compensating temperature and aging;
a high reference frequency counter configured to count pulses of said third pulse frequency during said measurement period as an upper limit value for compensating for the spacing height;
a subtraction device determining a difference between the upper limit value and the lower limit value to a obtain a maximum measurement value;
a measurement frequency counter configured to count pulses of said first pulse frequency during said measurement period as a measurement value indicating coverage of said first measuring coil by said measuring element; and
a standardization device configured to standardize a difference between said measurement value and said lower limit value using said maximum measurement value so as to provide a result indicative of said coverage of said first measuring coil by said measuring element.

33. The inductive position measuring device in accordance with claim 32, wherein the digital evaluation circuit comprises:
a system frequency generator configured to generate a system frequency from said second pulse frequency; and
a divider configured to divide said difference between said measurement value and said lower limit value based on said maximum measurement value exceeding a predetermined value.

* * * * *